United States Patent [19]

Hnizdor

[11] Patent Number: 5,394,637
[45] Date of Patent: Mar. 7, 1995

[54] KEELING BEND FLY HOOK

[76] Inventor: Thomas A. Hnizdor, 9164 Brady, Redford, Mich. 48239

[21] Appl. No.: 119,708

[22] Filed: Sep. 10, 1993

[51] Int. Cl.$^6$ ............................................. A01K 83/00
[52] U.S. Cl. ................................... 43/43.16; 43/42.25
[58] Field of Search ................. 43/42.25, 42.24, 43.16; D22/144, 128

[56] References Cited

U.S. PATENT DOCUMENTS

| | | | |
|---|---|---|---|
| 882,882 | 3/1908 | Henzel | 43/44.82 |
| 1,283,718 | 11/1918 | Ford | 43/44.82 |
| 1,430,626 | 10/1922 | Christensen | 43/43.16 |
| 1,635,644 | 7/1927 | Sloan | 43/42.25 |
| 1,875,182 | 8/1932 | Southwell | 43/44.82 |
| 2,178,301 | 10/1939 | Grant . | |
| 2,534,469 | 12/1950 | Moore | 43/44.82 |
| 2,800,740 | 7/1957 | Glaze | 43/44.82 |
| 3,023,536 | 3/1962 | Williams | 43/42.25 |
| 3,367,060 | 2/1968 | Abercrombie | 43/42.33 |
| 3,605,317 | 9/1971 | Pobst | 43/42.25 |
| 4,163,337 | 8/1979 | Kress | 43/42.05 |
| 4,280,296 | 7/1981 | Volenec | 43/44.81 |
| 4,380,884 | 4/1983 | Pond | 43/42.09 |
| 4,559,736 | 12/1985 | Sienkiewicz | 43/42.25 |
| 4,835,898 | 6/1989 | Pond | 43/43.16 |
| 4,914,852 | 4/1990 | Hnizdor | 43/44.82 |
| 4,965,957 | 10/1990 | Hnizdor | 43/44.82 |
| 5,065,541 | 11/1991 | Coody | 43/42.25 X |
| 5,097,621 | 3/1992 | Hnizdor | 43/42.32 |

OTHER PUBLICATIONS

Mustad Fish Hook Catalog, cat. No. 0692, pp. 1-2, 1992.
McClane's New Standard Fishing Encyclopedia & International Angling Guide, vol. 2 (1974) pp.459-470 & 509.
Fly Tier's Bench, Tandem Streamers; Ray Salminen, pp. 78-80.

*Primary Examiner*—P. Austin Bradley
*Assistant Examiner*—Jeanne M. Elpel
*Attorney, Agent, or Firm*—Basile and Hanlon

[57] ABSTRACT

A fly hook includes a shank with first and second ends. A first end of a bend of the shank extends from the second end at a predetermined angle from the axis of the shank. The bend terminates in a rolled-in point which is bent inward toward the shank. Further, the spear end of the hook is further bent inward toward the shank to bring the point into a substantial parallel position with respect to the shank. A body of buoyant material is disposed about the first end of the shank and, in combination with the offset bend, maintains the point of the hook in an upward position during drawing in of the hook.

16 Claims, 1 Drawing Sheet

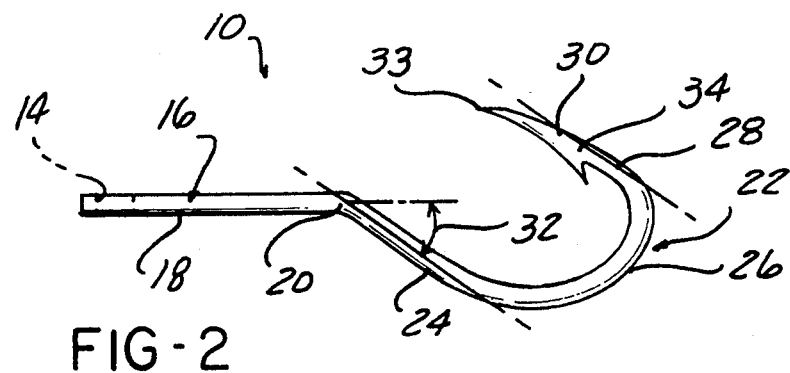
FIG-2
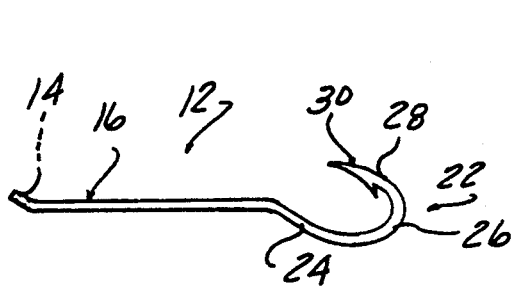
FIG-3
FIG-1
PRIOR ART
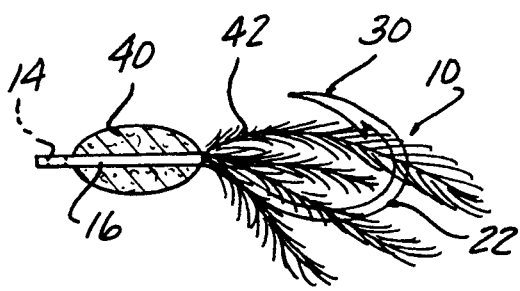
FIG-4
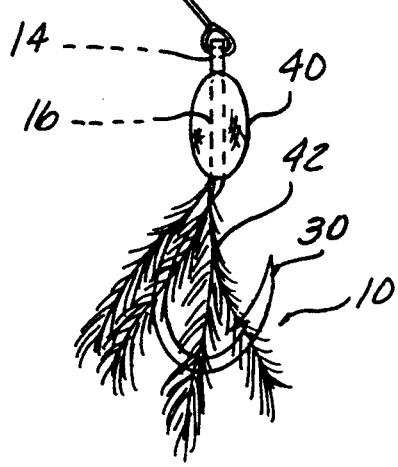
FIG-5
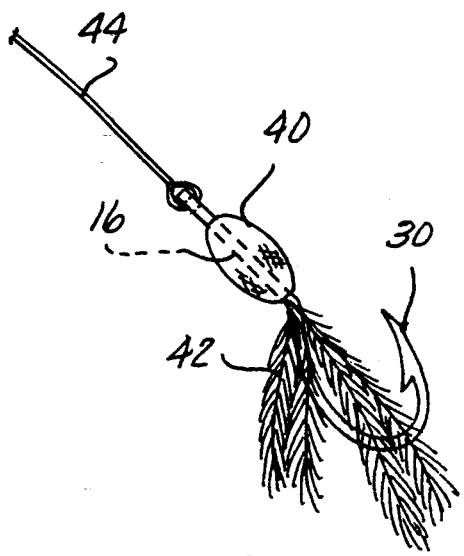
FIG-6

5,394,637

KEELING BEND FLY HOOK

BACKGROUND OF THE INVENTION

1. Field of the Invention

The present invention relates, in general, to fishhooks and, more particularly, to fly hooks.

2. Description of the Art

Hundreds of fishhooks of many different sizes and shapes have been devised for specific purposes. Hook shape can vary in a number of different features or parts including, gap size, point type, bend shape and bend offset, to name a few, depending upon the type of fish being sought, fishing conditions, or the type of fishing, i.e., bait or fly fishing.

Bait hooks with a rolled-in point wherein the point is bent toward the shank have been recognized as being without peer for bait fishing, McClane's NEW STANDARD FISHING ENCYCLOPEDIA, and INTERNATIONAL ANGLING GUIDE, second edition (1974) page 469. This is probably due to the increased bait retention provided by such a hook shape. However, such rolled-in points have not previously been used on fly hooks since a slight bent out point is considered to be desirable for small flies, see McClane's, page 469, supra. Indeed, a catalog of fishhooks provided by Mustad, a major fishhook manufacturer, is completely devoid of any rolled-in point on a hook devised specifically for fly fishing.

Fly hooks have a tendency to ride hook point down in the water with the hook point located below the shank due to the weight of the bend and point portion of the hook. A large number of fishing flies have a floatation member mounted on the shank of the hook. This floatation member also causes the hook to ride in a downward facing position below the shank when the hook is cast into the water or drawn toward the fisherman. Such a hook down position makes hooking fish that have downward facing mouths quite difficult. Thus, many anglers, and in particular, salt water anglers, would prefer the flies to ride in a hook up position.

Keel hooks, as shown in FIG. 1, have a step shank, with a straight point which is parallel to the shank. Such keel hooks are usually snagless since the point rides upward due to the weight of the keel or bend portion of the shank. However, such keel hooks have a relatively short shank due to the step which places a major portion of the length of the shank in the keel portion of the hook. Present day keel hooks teach the use of heavy, or weighted materials on the step shank portion of the hook to cause the hook to invert and ride in a point up position, as taught by McClane's, page 509, supra. However, any floatation or buoyant material mounted on the step shank of a present day keel hook would cause the bend and shank portion of the hook to be heavier than the floating portion of the fly thereby revolving the body until the heaviest portions are in the lowermost position. This places the hook in the undesired downward position.

In order to provide the more desirable hook point up feature, fly tiers and fly anglers have been known to tie lead eyes below the shank of the hook with the hook in a point up position. Gravity causes the lead eyes to invert the hook to a desired point up position when fishing. Other fly materials consisting of a body and wings are tied on the top of the hook shank with the bulk of such materials helping to turn the fly over to the hook point up position. While tying a fly in this manner is an effective means of making the fly ride in a hook point up orientation, the additional materials create an undesirable affect due to the weight which becomes more evident when fly casting. The less a fly weighs, the better it is for casting. Adding lead eyes to the fly makes the fly dangerous and uncomfortable to cast and, further, causes the fly to be cumbersome at the generation of the backcast.

Many salt water flies are tied in tandem with two spaced hooks interconnected by a steel cable extending from the end of the shank of one hook to the beginning of the shank of the second or rearmost hook. The frontmost hook is generally one size larger than the rear hook and, being much heavier and larger than the rear hook, acts as a keel to turn the fly over in the water when the rear hook is joined in the point up position to the front hook.

Thus, it would be desirable to provide a fly hook which rides point up when drawn through the water. It would also be desirable to provide a fly hook which easily accepts a buoyant body or buoyant material on the shank. Finally, it would be desirable to provide a fly hook which has the above-described features as well as providing excellent fish hooking and retention capabilities.

SUMMARY OF THE INVENTION

The present invention is a fly fishing hook which includes unique features previously unknown in fly hooks. The fly hook includes a shank having first and second ends, with an eye being formed at the first end. A bend arcuately extends from the second end of the shank and has at least first and second portions. The first portion of the bend is disposed at a predetermined angle from the axis of the shank. A point is formed on the end of the second portion of the bend and is rolled inward toward the shank. The spear portion of the hook, which includes the end of the second portion of the bend and the point, is further bent in toward the shank to bring the point in a substantial parallel position with respect to the axis of the shank.

A body of buoyant material is preferably mounted over the first end of the shank.

The keeling bend fly hook of the present invention includes an intermediate bend portion offset from the axis of the shank to create a keel action which, in combination with a buoyant body mounted on the shank, ensures that the point of the hook rides in an upward position during drawing or reeling in of the hook. This presents the point in an ideal position for increased hook penetration. Further, the rolled-in point and the further bending-in of the entire spear or end portion of the bend and the point, increases the retention of the hook in a fish.

When utilized with a floating body and dressed with absorbent materials at the bend, the keeling bend fly hook of the present invention solves a large number of the problems involved in fly fishing. Excessive weight for extra hooks or lead eyes is eliminated. In addition, excessive effort needed to withdraw heavy flies from deep water depths is also eliminated thereby reducing fatigue associated with the use of heavy flies. The floating body can be made with a diving lip which allows the fly to reach greater depth and to return to the surface when at rest. The reduction of weight in the fly also decreases the danger involved in fly casting heavy flies.

BRIEF DESCRIPTION OF THE DRAWING

The various features, advantages and other uses of the present invention will become more apparent by referring to the following detailed description and drawing in which:

FIG. 1 is a front elevational view of a prior art keel hook;

FIG. 2 is a front elevational view of a keeling bend fly hook according to the teachings of the present invention;

FIG. 3 is a front elevational view of a different sized keeling bend hook according to the present invention;

FIG. 4 is a front elevational view of the keeling bend hook shown in FIG. 2 dressed with a buoyant body and feathers in a typical fly dressing;

FIG. 5 is a pictorial representation of the keeling bend fly hook of FIG. 2 shown in a use position immediately after casting; and FIG. 6 is a pictorial representation of a keeling bend fly hook of FIG. 2 shown in a position with the hook being drawn through the water.

DESCRIPTION OF THE PREFERRED EMBODIMENTS

Referring now to the drawing, and to FIGS. 2-6, there is depicted a keeling bend fly hook constructed in accordance of the teachings of the present invention. A large size keeling bend fly hook 10 is depicted in FIG. 2. The hook 10 may be formed of any suitable hook material, such as stainless steel, etc. Further, the hook 10, while being shown in a relatively large size in FIG. 2, may also be provided in other sizes, such as the smaller keeling bend fly hook 12 shown in FIG. 3. Both of the hooks 10 and 12 have the same overall shape, but the elements or parts of each hook 10 and 12 are provided in different sizes or proportions.

The hook 10 includes an eye 14. The eye 14 may have any typical eye shape, such as ball, tapered, looped, needle, brazed or flattened. In addition, the eye may be provided in a number of different positions with respect to the shank 16, such as a ringed eye, a turned down eye or a turned up eye.

The shank 16 of the hook 10 has a first end 18 joined to and extending from the eye 14. The shank 16 and the eye 14 may be integrally formed as a continuous, unitary element of the hook 10. The shank 16 is linear or straight between the first end 18 and an opposed second end 20. The length of the shank 16 between the first and second ends 18 and 20, respectively, may be provided in any suitable length. However, it is preferred that the length of the shank 16 have a sufficient length so as to easily receive a buoyant body or mass of buoyant material thereon, as described hereafter.

The hook 10 includes a bend 22 which extends continuously and preferably arcuately from the second end 20 of the shank 16. The bend 22 includes a first end bend portion 24 extending from the second end 20 of the shank 16, an intermediate bend portion 26, and a second end bend portion 28 which terminates in a point shown generally by reference number 30. According to a preferred embodiment of the present invention, the first end bend portion 24 is bent at a predetermined angle, shown by reference number 32, from the axis of the shank 16. In a preferred example, which is described as exemplary only, and not by way of limitation, the first end portion 24 of the bend 22, and, in particular, a chord line extending through the opposite ends of the first end bent portion 24 is disposed at an angle of approximately 33° from the axis of the shank 16. The first end bend portion 24 curves smoothly into the intermediate bend portion 26. Due to the angular disposition of the first end portion 24 of the bend 22 from the axis of the shank 16, the first end bend portion 24 and the intermediate bend portion 26 are disposed offset or to one side of the axis of the shank 16. This provide a keel shape, similar to the prior art keel hook shown in FIG. 1, which provides weight to one side of the shank 16 so as to dispose the point 30 of the hook 10 in an upward position during use of the hook 10, as described hereafter.

The second end bend portion 28 of the bend 22 also extends continuously from the intermediate portion 26 of the bend 22. A point 30 is formed at the end of the second end portion 28. In a preferred embodiment, the point 30 is formed as a rolled-in or bent-in point in which the tip 33 of the point 30 is bent in toward the shank 16. The point 30 also includes a conventional barb 34.

Further, according to the present invention, the so-called "spear" portion of the hook which includes the point 30, the barb 34, and the second end bend portion 28 of the bend 22 is further bent-in toward the shank 16. Preferably, the spear portion of the hook 10 is bent toward the shank 16 until the spear portion including the second end bend portion 28 and the point 30 approaches a substantially parallel position with respect to the first end portion 24 of the bend 22. In this position, chord lines extending through each of the first and second end bend portions 24 and 28 are substantially parallel. This closes the gap space between the tip 33 of the point 30 and the shank 16, but provides a sufficiently open gap for excellent point 30 penetration and hook retention. In addition to the rolled-in tip 33 of the point 30, the bending in of the entire spear portion of the hook 10 toward the shank 16 places the tip 33 in a substantial parallel alignment with the axis of the shank 16 for greater hook penetration and hook retention.

As shown in FIG. 4, the hook 10 may be fully dressed as a fly by mounting buoyant material 40 about the shank 16. The buoyant material 40 may preferably be provided in an aerodynamic-shaped body formed of a suitable buoyant material, such as cork, STYROFOAM, etc. Feathers 42 may be tied to the second end 20 of the shank 16 and extend outward therefrom around the hook 10. As shown in FIG. 4, the entire bend 22 in the hook 10 extends outward from the buoyant material or body 40.

FIGS. 5 and 6 depict use positions of the hook 10 when dressed as a fly including the body 40 of buoyant material and the feathers 42. In FIG. 5, the hook 10 is shown in a generally vertical position immediately after being cast into the water. The hook 10 depends from one end of a line 44 which is tied to the eye 14 of the hook 10. The point 30 is substantially parallel to the shank 16 of the hook 10. When the line 44 is drawn or reeled in towards the fishermen, the hook 10 assumes the position shown in FIG. 6 in which the point 30 is substantially aligned in parallel with the shank 16 and the hook 10 rides point up through the water.

In summary, there has been disclosed a unique keeling bend fly hook which includes a unique hook design which provides increased hook penetration and hook retention previously unavailable in fly hooks. The hook of the present invention is formed with a keeling bend extending angularly from the shank and terminates in a rolled-in point. In addition, the entire spear of the hook is further bent inward toward the shank to place the point in substantial parallel alignment with the shank of the hook.

What is claimed is:

1. A fly hook comprising:
   a shank having first and second ends;
   an eye formed at the first end of the shank;
   a keel bend extending from the second end of the shank, the bend having first and second end portions and an intermediate portion between the first and second end portions, the first end portion disposed to one side of a longitudinal axis of the shank at an obtuse angle with respect to the shank to offset the intermediate portion to one side of the longitudinal axis of the shank; and
   a point formed on and extending from an end of the second end portion of the bend angularly outward from the longitudinal axis of the shank, the point terminating in a tip rolled-in toward the shank;
   the point and the second end portion of the bend disposed on an opposite side of the longitudinal axis of the shank from the intermediate portion of the bend.

2. The fly hook of claim 1 wherein:
   the second end portion of the bend is bent inward toward the shank such that the tip of the point extends generally in the direction of the longitudinal axis of the shank.

3. The fly hook of claim 2 wherein:
   a tangential line extending through the tip is generally parallel to and spaced from the longitudinal axis of the shank.

4. The fly hook of claim 1 further comprising:
   buoyant material mounted over the shank.

5. The fly hook of claim 4 wherein the buoyant material has an aerodynamic exterior shape.

6. The fly hook of claim 1 wherein:
   the bend and the point are co-planar with the shank.

7. The fly hook of claim 1 wherein:
   the first and second portions of the bend smoothly curve from the second end of the shank.

8. The fly hook of claim 1 wherein:
   the shank has a length at least substantially equal to the linear length of the bend between the first and second end portions thereof.

9. A fly hook comprising:
   a shank having first and second ends;
   an eye formed on the first end of the shank;
   buoyant material mounted over the first end of the shank;
   a keel bend formed co-planarly with the shank and extending from the second end of the shank, the bend having first and second end portions and an intermediate portion between the first and second end portions, the first end portion being disposed to one side of a longitudinal axis of the shank wherein the second end portion of the bend is substantially parallel to the first end portion of the bend at an obtuse angle with respect to the shank to offset the intermediate portion to one side of the longitudinal axis of the shank; and
   a point formed on and extending from an end of the second end portion of the bend angularly outward from the longitudinal axis of the shank, the point terminating in a tip rolled-in toward the shank;
   the point and the second end portion of the bend disposed on an opposite side of the longitudinal axis of the shank from the intermediate portion of the bend;
   the second end portion of the bend and the point being bent inward toward the shank substantially parallel to the first end portion such that the tip of the point extends generally in a direction parallel to the longitudinal axis of the shank.

10. An artificial fly comprising:
    a body formed of buoyant material;
    a hook having a shank with first and second ends, the first end of the shank being disposed within the body of buoyant material;
    an eye formed at the first end of the shank and extending outward from the body;
    a keel bend extending from the second end of the shank exteriorly of the body and having first and second portions and an intermediate portion between the first and second end portions, the first end portion disposed at an obtuse angle with respect to the shank to offset the intermediate portion to one side of the longitudinal axis of the shank wherein the second end portion of the bend is substantially parallel to the first end portion of the bend; and
    a point formed on and extending from an end of the second end portion of the bend angularly outward from the longitudinal axis of the shank, the point terminating in a tip rolled-in toward the shank;
    the point and the second end portion of the bend disposed on an opposite side of the longitudinal axis of the shank from the intermediate portion of the bend.

11. The artificial fly of claim 10 wherein the buoyant body has an aerodynamic exterior shape.

12. The artificial fly of claim 10 wherein the second end portion of the bend is bent inward toward the shank such that the tip of the point extends generally in a direction parallel to the longitudinal axis of the shank.

13. The artificial fly of claim 12 wherein:
    a tangential line extending through the tip is generally parallel to and spaced from the longitudinal axis of the shank.

14. The artificial fly of claim 10 wherein:
    the bend and the point are co-planar with the shank.

15. The artificial fly of claim 10 wherein:
    the first and second portions of the bend smoothly curve from the second end of the shank.

16. The artificial fly of claim 10 wherein:
    the shank has a length at least substantially equal to the linear length of the bend between the first and second end portions thereof.

* * * * *